(12) United States Patent
Suh et al.

(10) Patent No.: US 9,077,400 B2
(45) Date of Patent: Jul. 7, 2015

(54) INTERFERENCE ALIGNMENT METHOD AND APPARATUS IN WIRELESS COMMUNICATION SYSTEM

(71) Applicant: Samsung Electronics Co., Ltd., Gyeonggi-do (KR)

(72) Inventors: Sang-Wook Suh, Gyeonggi-do (KR); Chan-Hong Kim, Gyeonggi-do (KR)

(73) Assignee: SAMSUNG ELECTRONICS CO., LTD, Suwon-Si (KR)

( * ) Notice: Subject to any disclaimer, the term of this patent is extended or adjusted under 35 U.S.C. 154(b) by 0 days.

(21) Appl. No.: 14/069,322

(22) Filed: Oct. 31, 2013

(65) Prior Publication Data

US 2014/0119465 A1    May 1, 2014

(30) Foreign Application Priority Data

Oct. 31, 2012    (KR) .................. 10-2012-0122303

(51) Int. Cl.
*H04B 7/04*    (2006.01)
*H04J 11/00*    (2006.01)

(52) U.S. Cl.
CPC .......... *H04B 7/0413* (2013.01); *H04J 11/0033* (2013.01)

(58) Field of Classification Search
CPC . H04B 7/0456; H04J 11/0026; H04J 11/0033
USPC .................. 375/260, 267, 299, 340, 346, 347
See application file for complete search history.

(56) References Cited

U.S. PATENT DOCUMENTS

| 2011/0051837 | A1  | 3/2011 | Park et al. |
| 2011/0200127 | A1  | 8/2011 | Lee et al. |
| 2012/0039419 | A1  | 2/2012 | Maddah-Ali et al. |
| 2012/0163433 | A1  | 6/2012 | Koike-Akino et al. |
| 2014/0105120 | A1* | 4/2014 | Jose et al. ..................... 370/329 |
| 2014/0105121 | A1* | 4/2014 | Jose et al. ..................... 370/329 |

FOREIGN PATENT DOCUMENTS

KR    2011 0093361 A1    8/2011
WO    WO 2010/123700 A1    10/2010

OTHER PUBLICATIONS

International Search Report dated Feb. 10, 2014 in connection with International Patent Application No. PCT/KR2013/009787, 3 pages.

(Continued)

*Primary Examiner* — Leon Flores

(57) ABSTRACT

A method for supporting Interference Alignment (IA) in a wireless communication system includes multiplying a plurality of input symbols by precoding vectors for Interference Alignment (IA) to generate a plurality of signal vectors, mapping the signal vectors to subcarriers having unequal spacings to perform Inverse Fast Fourier Transform (IFFT), in which each signal element of the signal vector is mapped to two subcarriers among the subcarriers, converting the IFFT-transformed signal into a wireless signal and transmitting the wireless signal from a first transmitter to a receiver, and transmitting, to the receiver, information regarding precoding vectors used in the first transmitter and in second and third transmitters that communicate using the same frequency resource as the first transmitter for the IA.

28 Claims, 5 Drawing Sheets

(56) References Cited

OTHER PUBLICATIONS

Written Opinion of International Searching Authority dated Feb. 10, 2014 in connection with International Patent Application No. PCT/KR2013/009787, 4 pages.

Viveck R. Cadambe, et al., "Interference Alignment and Degrees of Freedom of the K-User Interference Channel", IEEE Transactions on Information Theory, vol. 54, No. 8, Aug. 2008, 17 pages.

* cited by examiner

INTERFERENCE ALIGNMENT METHOD AND APPARATUS IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to Korean Patent Application Serial No. 10-2012-0122303, which was filed in the Korean Intellectual Property Office on Oct. 31, 2012, the entire disclosure of which is hereby incorporated by reference.

TECHNICAL FIELD

The present disclosure generally relates to a wireless communication system, and more particularly, to a method and apparatus for performing interference alignment in a wireless communication system that uses a plurality of independent frequency resources for data transmission.

BACKGROUND

Wireless communication systems use limited frequency resources, and thus a research on a scheme for efficiently using given frequency resources has been actively conducted. Unlike a Frequency Division Multiple Access (FDMA) scheme using a guard band between subcarriers, Orthogonal Frequency Division Multiplexing (OFDM) overlaps bands while keeping subcarriers orthogonal to each other, thereby improving frequency efficiency, and therefore, OFDM has been recently employed as a standard for most communication and broadcast transmission schemes.

One of other methods for improving a data transfer rate is to simultaneously transmit several signals in one frequency resource and control interference caused by such transmission. With a scheme, a transmitter or a receiver can cancel interference by exploiting channel information. An interference control scheme actively studied in recent times is an Interference Alignment (IA) scheme that avoids interference through proper signal processing, instead of canceling interference. The IA scheme theoretically achieves a Degree of Freedom (DOF) of K/2 in an interference channel where there are K users, but a practical IA scheme capable of achieving a DoF of K/2 is not yet to be persuaded.

The following example regards an IA scheme applicable to a restricted case of K=3. The IA scheme can be roughly classified into time-domain, frequency-domain, and space-domain schemes.

According to the time-domain IA scheme, assuming that in an interference channel including three transmitters and three receivers, a desired signal has a time delay of 1 and an interference signal has a time delay of 2, in the first time slot of two independent time slots, each of the three transmitters transmits one different signal to achieve a DoF of 3/2. However, such an assumption is applicable only to a very limited area and thus is not realistic. Moreover, in a real channel, there is multipath delay spread, such that the assumption is difficult to apply to a real communication environment.

According to the frequency-domain IA scheme, in an interference channel including three transmitters and three receivers, (3n+1) data are IA-precoded and transmitted in (2n+1) independent frequency domains, and the three transmitters transmit n, n, and (n+1) data, respectively, such that as n increases, a DoF of 3/2 may be achieved. However, actually, a finite natural number n has to be used, and thus a DoF is smaller than 3/2.

Last, according to the space-domain IA scheme, three transmitters and three receivers have the same M ($\geq$2) antennas, thus achieving a DoF of 3M/2. However, this scheme also has a restriction of requiring the same number of antennas, M for each transmitter and receiver.

SUMMARY

To address the above-discussed deficiencies, it is a primary object to provide a method and apparatus for transmitting and receiving a signal in a communication system.

Certain embodiments of the present disclosure provide a method and apparatus for performing interference alignment in a wireless communication system that uses plural independent frequency resources for data transmission.

Certain embodiments of the present disclosure provide a method and apparatus for transmitting three data signals over two subcarriers to improve frequency efficiency.

Certain embodiments of the present disclosure provide a method and apparatus for determining a pre-coding vector for interference alignment in a wireless communication system.

Certain embodiments of the present disclosure provide a method and apparatus for detecting a desired signal based on received signals in two frequency resources from three transmitters using an IA scheme.

Other objects to be provided in the present disclosure may be understood by embodiments described below.

Certain embodiments of the present disclosure provide an interference alignment method in a wireless communication system. The interference alignment method includes: multiplying a plurality of input symbols by precoding vectors for Interference Alignment (IA) to generate a plurality of IA-encoded signal vectors; mapping the IA-encoded signal vectors to subcarriers that are un-equally spaced; performing Inverse Fast Fourier Transform (IFFT) on the IA-encoded signal vectors for OFDM modulation to generate OFDM symbols; up-converting the OFDM symbols into wireless signals and transmitting the wireless signals from three transmitters to three receivers; and forwarding information regarding the precoding vectors used in the second and the third transmitters that share the same frequency resources with the first transmitter to the first receiver, so that the first receiver can perform the IA decoding process of a desired signal.

Certain embodiments of the present disclosure provide an interference alignment method in a wireless communication system. The interference alignment method includes: receiving wireless signals transmitted from first through third transmitters that share the same frequency resource for Interference Alignment (IA); down-converting the wireless signals to baseband signals; extracting the OFDM symbols that are mapped to un-equally spaced subcarriers from the down-converted signals; performing Fast Fourier Transform (FFT) on the OFDM symbols; receiving information regarding precoding vectors used for IA in the first through third transmitters; and detecting a desired signal by decoding the FFT-performed signals using the precoding vectors.

Certain embodiments of the present disclosure provide a transmission apparatus for supporting interference alignment in a wireless communication system. The transmission apparatus includes: a precoder configured to multiply a plurality of input symbols by precoding vectors for Interference Alignment (IA) to generate a plurality of IA-encoded signal vectors; an Inverse Fast Fourier Transform (IFFT) unit configured to map the IA-encoded signal vectors to subcarriers that are un-equally spaced and to perform IFFT on the IA-encoded signal vectors for OFDM modulation to generate OFDM symbols; a transmission circuit configured to up-convert the OFDM symbols into wireless signals and to transmit the wireless signals from three transmitters to three receivers; and a control information transmitter configured to forward information regarding the precoding vectors used in the second and the third transmitters that share the same frequency resources with the first transmitter to the first receiver, so that the first receiver can perform the IA decoding process of a desired signal.

Certain embodiments of the present disclosure provide a reception apparatus for performing interference alignment in a wireless communication system. The reception apparatus includes: a frequency converter configured to receive wireless signals transmitted from the first through third transmitters that share the same frequency resource for Interference Alignment (IA) and to down-convert the wireless signals to baseband signals; a sampling unit configured to extract OFDM symbols that are mapped to un-equally spaced subcarriers from the down-converted signals; a FFT unit configured to perforin FFT on the OFDM symbols; a feedback receiver configured to receive information regarding precoding vectors used for IA in the first through third transmitters; and a decoder configured to detect a desired signal by decoding the FFT-performed signals using the precoding vectors.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures and the reference numerals are used to describe components and features.

DETAILED DESCRIPTION

Figure 1:
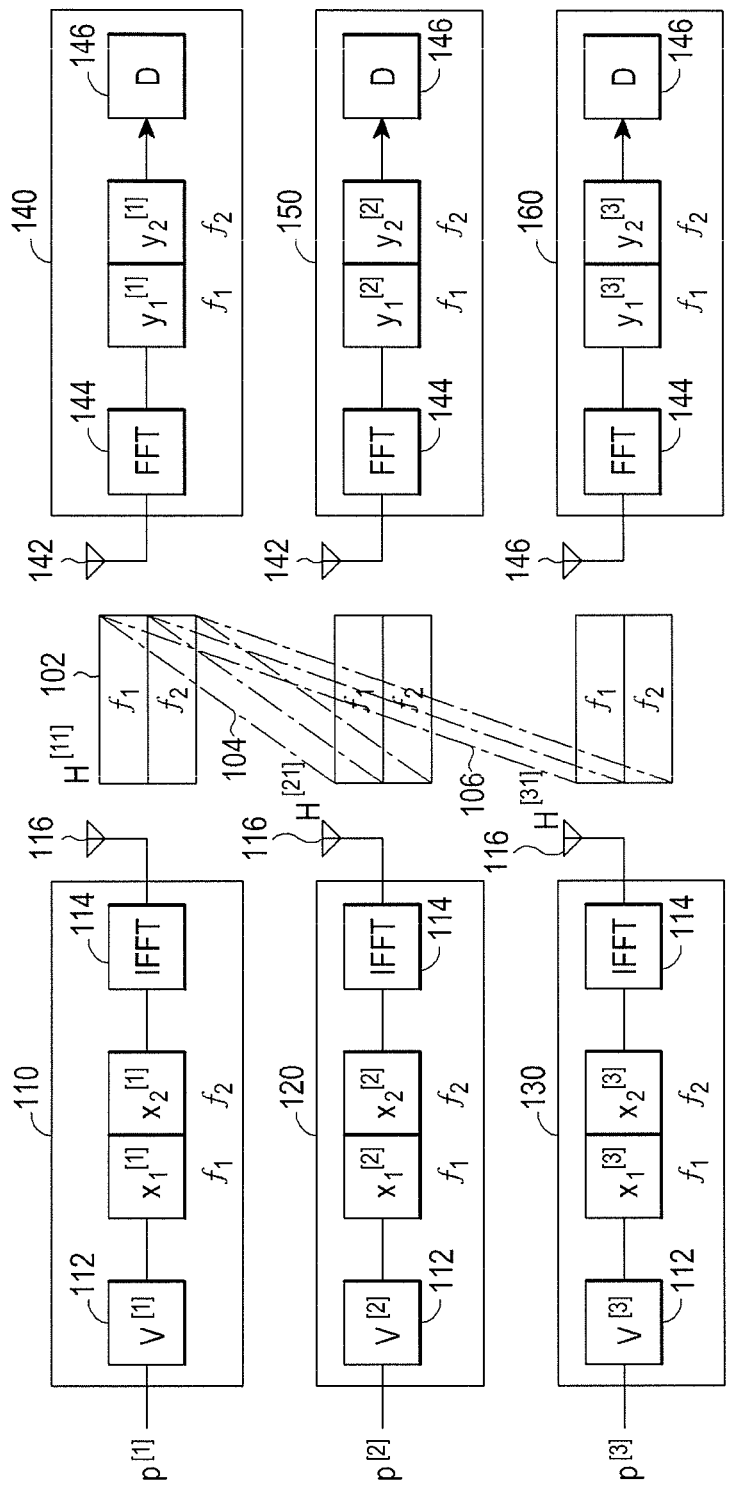
FIG. 1 illustrates a transmitter and receiver architecture in an interference channel environment according to embodiments of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, the following description referring to the accompanying drawings are provided to help overall understanding of various embodiments of the present invention defined in claims and equivalents thereof. While the following description includes various specific details to help the understanding, it will be regarded merely as examples. Therefore, those of ordinary skill in the art may recognize that various changes and modifications can be made to the embodiments described herein without departing from the scope and spirit of the present disclosure. The well-known functions and structures will not be described for clearness and clarity.

Hereinafter, the present disclosure will be described with reference to accompanying drawings. In the present disclosure, if it is determined that a detailed description of commonly-used technologies or structures related to the embodiments of the present disclosure unnecessarily obscure the subject matter of the disclosure, that detailed description will be omitted. Terms to be described below have been defined by considering functions in embodiments of the present disclosure, and may be defined differently depending on a user or operator's intention or practice. Therefore, the definitions of such terms will be based on the descriptions of the entire present specification.

In the following description, only parts necessary for understanding operations of the present disclosure will be described, and a detailed description of known functions and configurations incorporated herein will be omitted so as not to make the subject matter of the present disclosure unclear.

The terms and words used in the following description and claims are not limited to the bibliographical meanings, but, are used by the inventor to enable a clear and consistent understanding of the disclosure. Accordingly, it should be apparent to those skilled in the art that the following description of embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following embodiments relate to a method and apparatus for transmitting three data signals in every two subcarriers by using an Interference Alignment (IA) method in an Orthogonal Frequency Division Multiplexing (OFDM) wireless communication system.

In an interference channel including three transmitters and three receivers, the three transmitters transmit three total data in two independent frequency resources by using a frequency-domain IA method. The following IA method according to an embodiment of the present disclosure is applicable to any system that uses two or more even-number independent channels in a frequency domain, and may be suitable, especially, for an OFDM scheme. Hereinafter, the embodiments of the present disclosure applied to an OFDM system will be described.

FIG. 1 is a diagram showing a transmitter and receiver architecture in an interference channel environment according to embodiments of the present disclosure. In FIG. 1, a simplified interference channel environment including three transmitters 110, 120, and 130 and three receivers 140, 150, and 160 which communicate using two independent frequency resources is shown.

Referring to FIG. 1, the transmitters 110, 120, and 130 transmit a transmission signal p by using an IA method. Each of the transmitters 110, 120, and 130 includes an IA precoder 112 for the IA method and an Inverse Fast Fourier Transform (IFFT) unit 114 for OFDM modulation. In each of the transmitters 110, 120, and 130, the IA precoder 112 multiplies the signal p by a precoding vector V having a size of 2×1 for the IA method to transform the signal p into signal vectors $x_1$ and $x_2$. The IA precoder 112 then maps the signal vectors to two subcarriers $f_1$ and $f_2$, respectively, and an IFFT unit 114 performs OFDM modulation on the signal vectors $x_1$ and $x_2$ to generated OFDM symbols and transmits the OFDM symbols via an antenna 116.

Signals output from the transmitters 110, 120, and 130 arrive at an antenna 142 of the first receiver 140 through different channels $H^{[11]}$, $H^{[21]}$, and $H^{[31]}$ (102, 104, and 106) The signals received in the antenna 142 are transformed by a Fast Fourier Transform (FFT) unit 144 into received signal vectors $Y=[y_1, y_2]$ divided for the subcarriers $f_1$ and $f_2$. An IA decoder 146 detects a desired signal p by decoding the received signal vectors, by using precoding vectors $V^{[1]}$, $V^{[2]}$, and $V^{[3]}$ applied in the transmitters 110, 120, and 130 and subcarrier-specific channel information regarding channels 102, 104, and 106 ($H^{[11]}$, $H^{[21]}$, and $H^{[31]}$).

In FIG. 1, an interference channel environment is shown in which three transmitters transmit data to three receivers while sharing the same two independent frequency resources. A model for the interference channel environment can be extended to a 1024-FFT OFDM system, as shown in FIG. 2.

Figure 2:
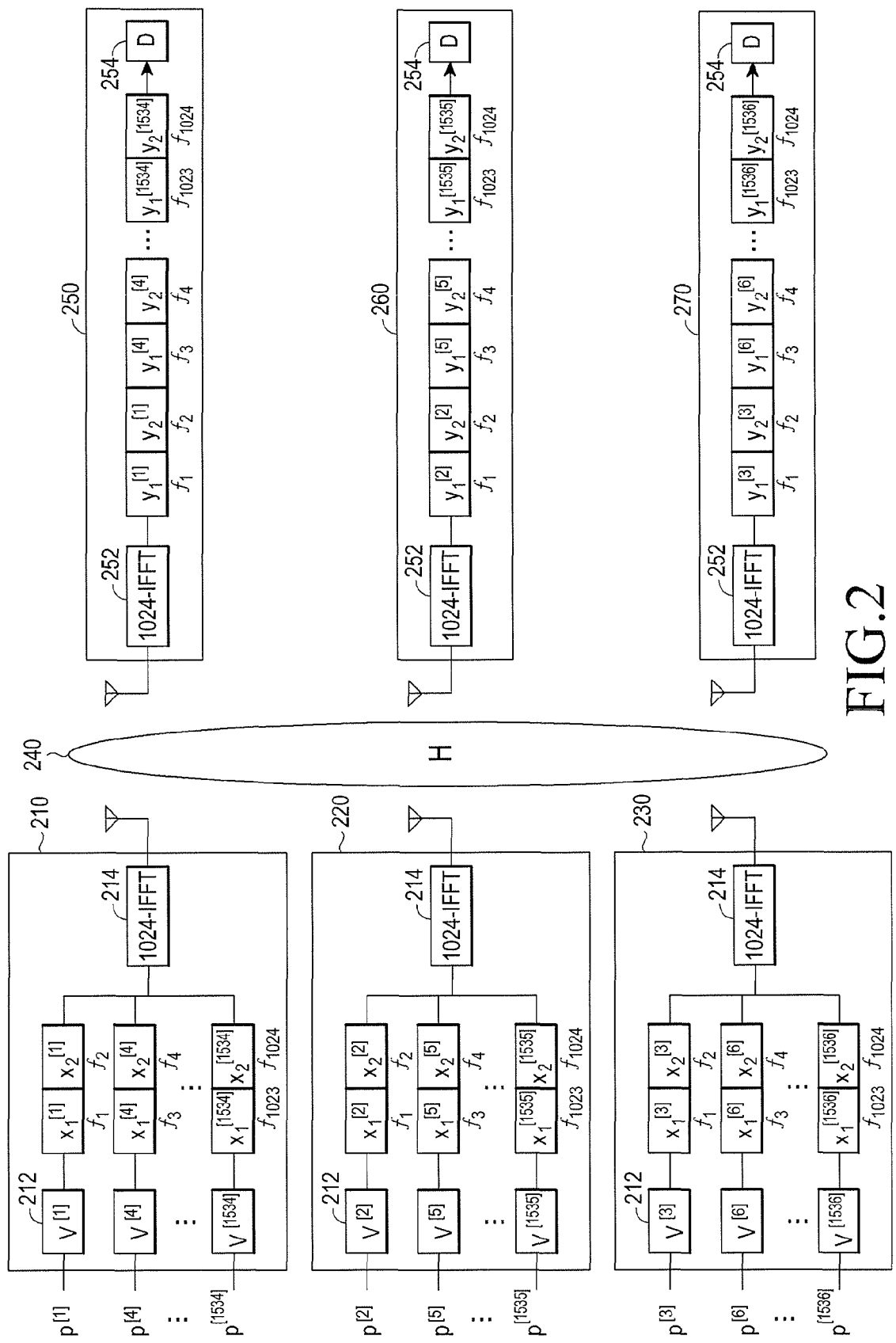
FIG. 2 illustrates a transmitter and receiver architecture to which a frequency-domain IA scheme is applied in a 1024-Fast Fourier Transform (FFT) OFDM system according to embodiments of the present.

FIG. 2 is a diagram showing a transmitter and receiver architecture to which a frequency-domain IA method is applied in a 1024-FFT OFDM system according to embodiments of the present disclosure. Herein, the number of signals simultaneously transmitted by three transmitters 210, 220, and 230 is 1536 and the number of subcarriers used is 1024. Thus, IFFT having a size of 1024 and FFT having a size of 1024 are used.

Referring to FIG. 2, the transmitters 210, 220, and 230 transmit signals p by using an IA method. In this example, the first transmitter 210 inputs therein 512 signals $p^{[1]}, p^{[4]}, \ldots, p^{[1534]}$ to be sent to the first receiver 250; the second transmitter 220 inputs therein 512 signals $p^{[2]}, p^{[5]}, \ldots, p^{[1535]}$ to be sent to the second receiver 260; and the third transmitter 230 inputs therein 512 signals $p^{[3]}, p^{[6]}, \ldots, p^{[1536]}$ to be sent to the third receiver 270. An IA precoder 212 corresponding to each input signal $p^{[i]}$ multiplies the input signal $p^{[i]}$ by a precoding vector $V^{[i]}$ to transform the input signal $p^{[i]}$ into signal vectors $x_1^{[i]}$ and $x_2^{[i]}$, and maps the signal vectors $x_1^{[i]}$ and $x_2^{[i]}$ to two different subcarriers that are allocated not to overlap among 1024 subcarriers, and then feed them into the input on an IFFT unit 214 having a size of 1024 (or a 1024-IFFT unit 214).

The signals output from the three transmitters 210, 220, and 230 arrive at three receivers 250, 260, and 270 through a channel H 240. In each of the receivers 250, 260, and 270, an FFT unit 252 having a size of 1024 (or a 1024-FFT unit 252) performs FFT on the received signal to transform the received signal into received signal vectors having a length of 1024. In the example shown in FIG. 2, the received signal vectors generated in the first receiver 250 are $y_1^{[1]}, y_2^{[1]}, y_2^{[4]}, y_2^{[4]}, \ldots, y_1^{[1534]}$, and $y_2^{[1534]}$; the received signal vectors generated in the second receiver 260 are $y_1^{[2]}, y_2^{[2]}, y_2^{[5]}, y_2^{[5]}, \ldots, y_1^{[1535]}$, and $y_2^{[1535]}$, and the received signal vectors generated in the third receiver 270 are $y_1^{[3]}, y_2^{[3]}, y_2^{[6]}, y_2^{[6]}, \ldots, y_1^{[1536]}$, and $y_2^{[1536]}$. An IA decoder 254 detects a and desired signal p from the received signal vectors, by using the precoding vectors $V(V^{[i]})$ used in each of the transmitters 210, 220, and 230 and subcarrier-specific channel information regarding the channel H 240.

Let a signal to be transmitted from the first transmitter to the first receiver be $p^{[3n+1]}$, a signal to be transmitted from the second transmitter to the second receiver be $p^{[3n+2]}$, and a signal to be transmitted from the third transmitter to the third receiver be $p^{[3n+3]}$, in which n=0, 1, . . . , 511 in FIG. 2. Then, each signal interferes with the other receivers than a destination receiver. Thus, each receiver can apply the IA method to two interference signals other than its desired signal.

Signal vectors obtained by multiplying transmission signals of respective transmitters $p^{[3n+1]}$, $p^{[3n+2]}$, and $p^{[3n+3]}$ by 2×1 precoding vectors $V^{[3n+1]}$, $V^{[3n+2]}$, and $V^{[3n+3]}$ for IA are expressed as:

$$\begin{bmatrix} x_1^{[3n+2]} \\ x_2^{[3n+2]} \end{bmatrix} = V^{[3n+2]} p^{[3n+2]} \quad (1)$$

$$\begin{bmatrix} x_1^{[3n+3]} \\ x_2^{[3n+3]} \end{bmatrix} = V^{[3n+3]} p^{[3n+3]}$$

In each transmitter, N/2 (=512) signals are mapped to signal vectors including N (=1024) signal elements through an IA precoder. The signal vectors pass through OFDM modulation based on N-IFFT and are carried in 1024 subcarriers. Since the transmitters transmit different signals, the number of data signals simultaneously transmitted by the three transmitters through IA is 3N/2 (=1536), such that spectrum efficiency increases by 3/2 times.

Let frequency-domain channels between the first transmitter and each receiver be $H^{[11]}$, $H^{[12]}$, and $H^{[13]}$; frequency-domain channels between the second transmitter and each receiver be $H^{[21]}$, $H^{[22]}$, and $H^{[23]}$; and frequency-domain channels between the third transmitter and each receiver be $H^{[31]}$, $H^{[32]}$, and $H^{[33]}$. Then, received signal vectors after FFT, which arrive at each receiver, is as below, in which $N_{f(2n+1)f(2n+2)}^{[3n+1]}$, $N_{f(2n+1)f(2n+2)}^{[3n+2]}$, and $N_{f(2n+1)f(2n+2)}^{[3n+3]}$ mean 2×1 noise matrices of respective receivers.

$$Y^{[3n+1]} = H_{f(2n+1)f(2n+2)}^{[11]} V^{[3n+1]} p^{[3n+1]} + H_{f(2n+1)f(2n+2)}^{[21]} V^{[3n+2]} p^{[3n+2]} + \quad (2)$$
$$H_{f(2n+1)f(2n+2)}^{[31]} V^{[3n+3]} p^{[3n+3]} + N_{f(2n+1)f(2n+2)}^{[3n+1]}$$

$$Y^{[3n+2]} = H_{f(2n+1)f(2n+2)}^{[12]} V^{[3n+1]} p^{[3n+1]} + H_{f(2n+1)f(2n+2)}^{[22]} V^{[3n+2]} p^{[3n+2]} +$$
$$H_{f(2n+1)f(2n+2)}^{[32]} V^{[3n+3]} p^{[3n+3]} + N_{f(2n+1)f(2n+2)}^{[3n+2]}$$

$$Y^{[3n+3]} = H_{f(2n+1)f(2n+2)}^{[13]} V^{[3n+1]} p^{[3n+1]} + F_{f(2n+1)f(2n+2)}^{[23]} V^{[3n+2]} p^{[3n+2]} +$$
$$H_{f(2n+1)f(2n+2)}^{[33]} V^{[3n+3]} p^{[3n+3]} + N_{f(2n+1)f(2n+2)}^{[3n+3]}$$

Subcarriers have independency in OFDM, such that 2×2 channel matrices between transmitters and receivers are diagonal matrices and thus a signal vector $Y^{[3n+1]}$ arriving at the first receiver are expressed as:

$$\begin{bmatrix} y_1^{[3n+1]} \\ y_2^{[3n+1]} \end{bmatrix} = \begin{bmatrix} h_{f(2n+1)}^{[11]} & 0 \\ 0 & h_{f(2n+2)}^{[11]} \end{bmatrix} \begin{bmatrix} v_1^{[3n+1]} \\ v_2^{[3n+1]} \end{bmatrix} \quad (3)$$

$$p^{[3n+1]} + \begin{bmatrix} h_{f(2n+1)}^{[21]} & 0 \\ 0 & h_{f(2n+2)}^{[21]} \end{bmatrix} \begin{bmatrix} v_1^{[3n+2]} \\ v_2^{[3n+2]} \end{bmatrix}$$

$$p^{[3n+2]} + \begin{bmatrix} h_{f(2n+1)}^{[31]} & 0 \\ 0 & h_{f(2n+2)}^{[31]} \end{bmatrix} \begin{bmatrix} v_1^{[3n+3]} \\ v_2^{[3n+3]} \end{bmatrix} p^{[3n+3]}$$

To obtain a precoding vector for IA, each channel matrix should not be a diagonal matrix. By making OFDM subcarrier spacings unequal, an off-diagonal term in each channel matrix can be substituted by a product of a non-zero scaling factors times a channel coefficient of a corresponding subcarrier. In this case, the received signal vector $Y^{[3n+1]}$ is expressed as:

$$\begin{bmatrix} y_1^{[3n+1]} \\ y_2^{[3n+1]} \end{bmatrix} = \begin{bmatrix} h_{f(2n+1)}^{[11]} & \varepsilon \\ \varepsilon & h_{f(2n+2)}^{[11]} \end{bmatrix} \begin{bmatrix} v_1^{[3n+1]} \\ v_2^{[3n+1]} \end{bmatrix} \quad (4)$$

$$p^{[3n+1]} + \begin{bmatrix} h_{f(2n+1)}^{[21]} & \varepsilon \\ \varepsilon & h_{f(2n+2)}^{[21]} \end{bmatrix} \begin{bmatrix} v_1^{[3n+2]} \\ v_2^{[3n+2]} \end{bmatrix}$$

$$p^{[3n+2]} + \begin{bmatrix} h_{f(2n+1)}^{[31]} & \varepsilon \\ \varepsilon & h_{f(2n+2)}^{[31]} \end{bmatrix} \begin{bmatrix} v_1^{[3n+3]} \\ v_2^{[3n+3]} \end{bmatrix} p^{[3n+3]}$$

The predetermined value (the non-zero scaling factor) $\varepsilon$, which is a cross-talk component between subcarriers, can be regarded as Inter-Carrier Interference (ICI) and is deterministically set according to a degree to which the subcarriers overlap, without being directly measured. As the subcarriers are disposed more adjacent to each other, a bandwidth of each subcarrier is maintained, while a total bandwidth of the same number of subcarriers is reduced.

Figure 3:
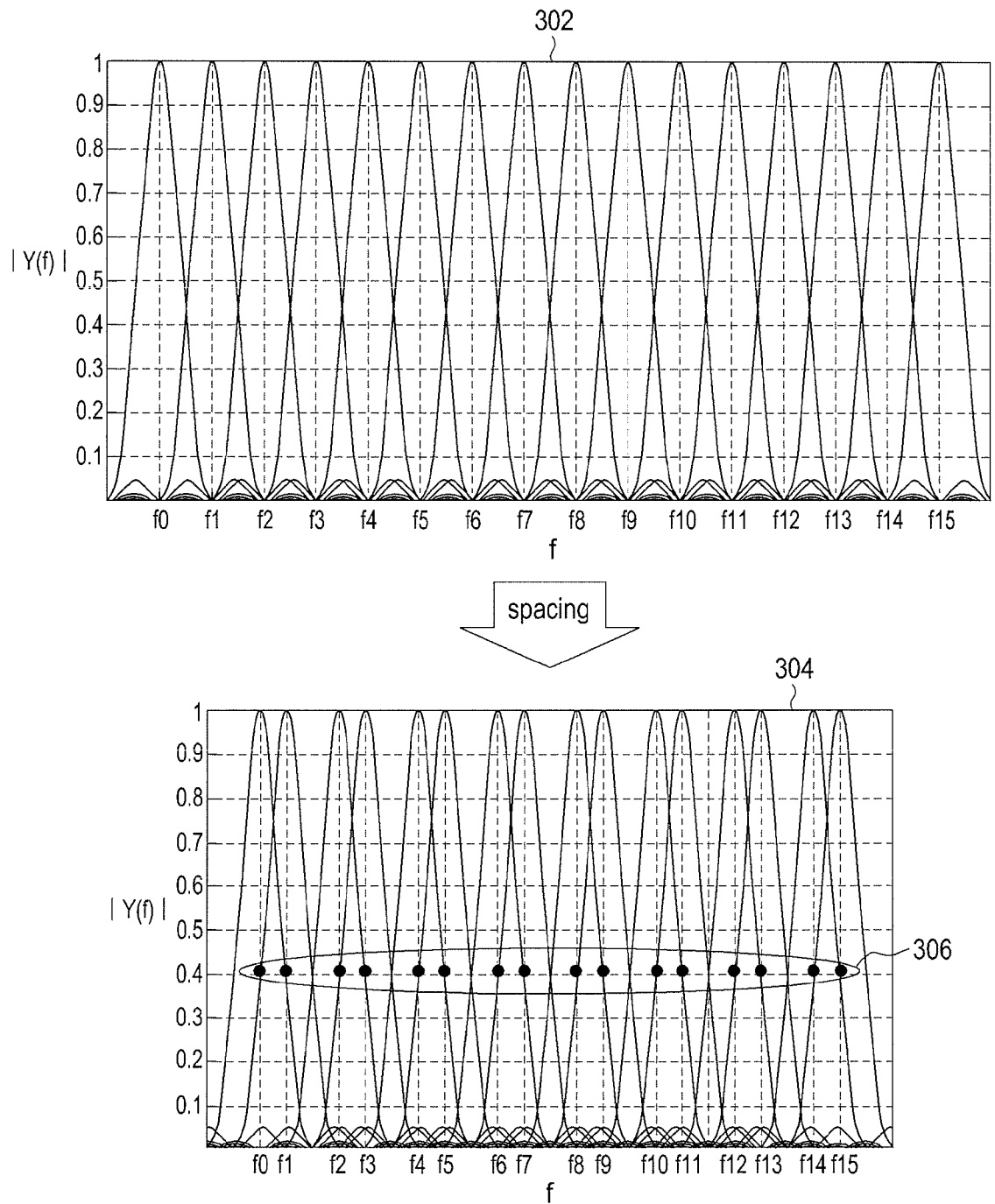
FIG. 3 illustrates a change of a subcarrier interval in an OFDM system according to embodiments of the present disclosure.

FIG. 3 illustrates a change in subcarrier spacings in an OFDM system according to embodiments of the present disclosure. Referring to FIG. 3, subcarriers 302 in another OFDM system have equal spacings, but subcarriers 304 arranged again according to embodiments of the present disclosure have unequal spacings and thus ICI 306 as expressed in Equation 4 can be generated between the subcarriers 304.

The transmitter reduces subcarrier spacings between subcarriers $f_{2k}$ and $f_{2k+1}$ by half and maintains subcarrier spacings between subcarriers $f_{2k+1}$ and $f_{2k+2}$, such that the subcarriers maintain orthogonality while having unequal spacings. In this case, if even-numbered subcarriers $f_0, f_2, f_4, \ldots$ and odd-numbered subcarriers $f_1, f_3, f_5, \ldots$ are grouped, respectively, the subcarriers in each group maintain equal spacings therebetween and the subcarriers in the two groups are spaced by $f_{offset}$ between the groups. For example, $f_{offset}$ is greater than 0 and less than or equal to spacings between subcarriers. In the example shown in FIG. 3, $f_{offset}$ is ½ of spacings between subcarriers.

Figure 4:
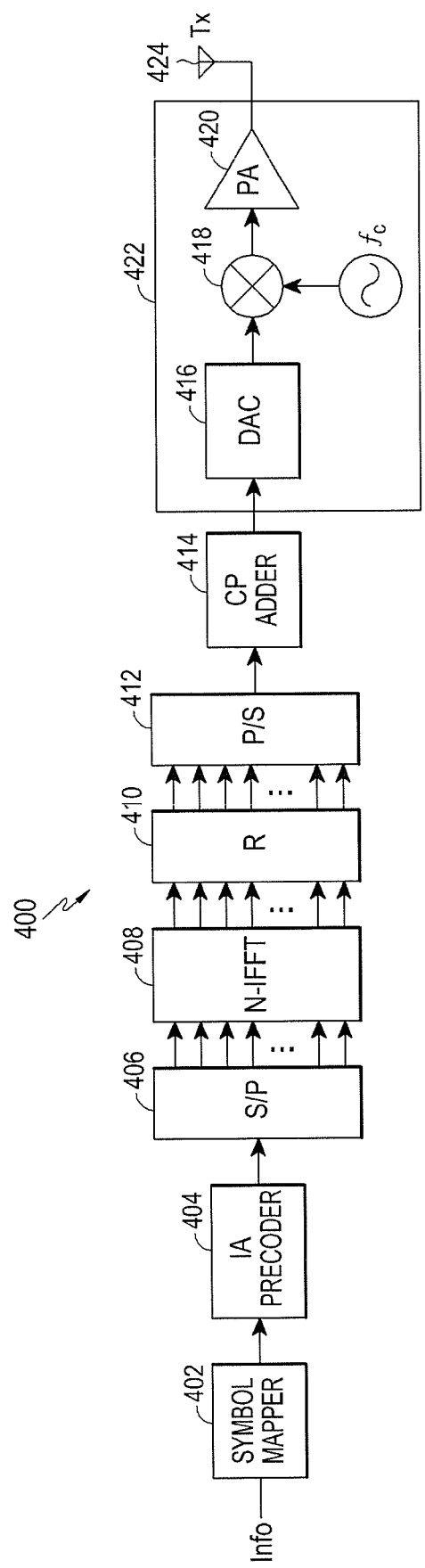
FIG. 4 illustrates a block diagram of a structure of a transmitter according to embodiment of the present disclosure.

FIG. 4 illustrates a block diagram of a structure of a transmitter according to embodiments of the present disclosure. Hereinbelow, the first transmitter for implementing unequal spacings between subcarriers for IA application is described more particularly.

Referring to FIG. 4, a symbol mapper 402 generates 512 symbols $p^{[1]}, p^{[4]}, \ldots$, and $p^{[1534]}$ containing information to be transmitted from a transmitter 400. An IA precoder 404 multiplies the symbols by IA precoding vectors to transform the symbols into signal vectors including 1024 signal elements $x_1^{[1]}, x_2^{[1]}, x_1^{[4]}, x_2^{[4]}, \ldots$, and $x_1^{[1534]}, x_2^{[1534]}$. Information about the IA precoding vectors is transmitted to a receiver through separate signaling, and the transmitter 400 includes a control information transmission unit (not shown) for transmitting the information. A Serial-to-Parallel Converter (S/P) 406 maps the signal elements ($x_1^{[1]}, x_2^{[1]}, x_1^{[4]}, x_2^{[4]}, \ldots$, and $x_1^{[1534]}, x_2^{[1534]}$) to 1024 inputs of a 1024-IFFT unit 408.

The 1024-IFFT unit 408 performs OFDM modulation on the input signal vectors to generate IFFT outputs including 1024 signal elements. A post-processor 410 is disposed between the IFFT unit 408 and a Parallel-to-Serial Converter (P/S) 412 for subcarrier spacings. The post-processor 410 is a filter bank expressed as an N×N (=1024×1024) matrix, and is implemented as an operating function R. The function R of the post-processor 410 multiplies each IFFT output (each output of the IFFT unit 408) by $e^{j2\pi f_{shift,k} n}$ in a time domain, such that a $k^{th}$ subcarrier is shifted by $f_{shift,k}$ in a frequency domain. Herein, n denotes a discrete time index for identifying each IFFT output in which n=0~(N−1). A frequency shift value $f_{shift,k}$ for a $k^{th}$ subcarrier is an example and can be defined as follows:

$$f_{shift,k} = \begin{cases} k - \dfrac{k}{2} f_{offset}, & k: \text{even} \\ k - \dfrac{k+1}{2} f_{offset}, & k: \text{odd}, \end{cases} \quad (5)$$

where k denotes a subcarrier index and $f_{offset}$ denotes a predefined frequency offset.

When N inputs $X_0, X_1, \ldots$, and $X_{N-1}$ of the frequency domain are transformed into N outputs $x_0, x_1, \ldots$, and $x_{N-1}$ of the time domain, the input/output relationship is expressed as:

$$x_n = \frac{1}{\sqrt{N}} \sum_{k=0}^{N-1} X_k e^{j\frac{2\pi}{N}\left(k - \left\lfloor \frac{k+1}{2} \right\rfloor f_{offset}\right)n} \quad (6)$$

$$(n = 0, 1, \ldots, N-1)$$

Equation 7 expresses Equation 6 as a determinant.

$$\begin{bmatrix} x_0 \\ x_1 \\ \vdots \\ x_n \\ \vdots \\ x_{N-1} \end{bmatrix} = \frac{1}{\sqrt{N}} \begin{bmatrix} e^{j\frac{2\pi}{N}(0-0\cdot f_0)\cdot 0} & e^{j\frac{2\pi}{N}(1-1\cdot f_0)\cdot 0} & \ldots & e^{j\frac{2\pi}{N}\left(k-\lfloor\frac{k+1}{2}\rfloor f_0\right)\cdot 0} & \ldots & e^{j\frac{2\pi}{N}\left(N-1-\frac{N}{2}f_0\right)\cdot 0} \\ e^{j\frac{2\pi}{N}(0-0\cdot f_0)\cdot 1} & e^{j\frac{2\pi}{N}(1-1\cdot f_0)\cdot 1} & \ldots & e^{j\frac{2\pi}{N}\left(k-\lfloor\frac{k+1}{2}\rfloor f_0\right)\cdot 1} & \ldots & e^{j\frac{2\pi}{N}\left(N-1-\frac{N}{2}f_0\right)\cdot 1} \\ \vdots & \vdots & \vdots & \vdots & & \vdots \\ e^{j\frac{2\pi}{N}(0-0\cdot f_0)n} & e^{j\frac{2\pi}{N}(1-1\cdot f_0)n} & \ldots & e^{j\frac{2\pi}{N}\left(k-\lfloor\frac{k+1}{2}\rfloor f_0\right)n} & \ldots & e^{j\frac{2\pi}{N}\left(N-1-\frac{N}{2}f_0\right)n} \\ \vdots & \vdots & & \vdots & & \vdots \\ e^{j\frac{2\pi}{N}(0-0\cdot f_0)(N-1)} & e^{j\frac{2\pi}{N}(1-1\cdot f_0)(N-1)} & \ldots & e^{j\frac{2\pi}{N}\left(k-\lfloor\frac{k+1}{2}\rfloor f_0\right)(N-1)} & \ldots & e^{j\frac{2\pi}{N}\left(N-1-\frac{N}{2}f_0\right)(N-1)} \end{bmatrix} \begin{bmatrix} X_0 \\ X_1 \\ \vdots \\ X_k \\ \vdots \\ X_{N-1} \end{bmatrix} \quad (7)$$

$$RF^{-1} = \frac{1}{\sqrt{N}} \begin{bmatrix} e^{j\frac{2\pi}{N}(0-0\cdot f_0)\cdot 0} & e^{j\frac{2\pi}{N}(1-1\cdot f_0)\cdot 0} & \ldots & e^{j\frac{2\pi}{N}\left(k-\lfloor\frac{k+1}{2}\rfloor f_0\right)\cdot 0} & \ldots & e^{j\frac{2\pi}{N}\left(N-1-\frac{N}{2}f_0\right)\cdot 0} \\ e^{j\frac{2\pi}{N}(0-0\cdot f_0)\cdot 1} & e^{j\frac{2\pi}{N}(1-1\cdot f_0)\cdot 1} & \ldots & e^{j\frac{2\pi}{N}\left(k-\lfloor\frac{k+1}{2}\rfloor f_0\right)\cdot 1} & \ldots & e^{j\frac{2\pi}{N}\left(N-1-\frac{N}{2}f_0\right)\cdot 1} \\ \vdots & \vdots & & \vdots & & \vdots \\ e^{j\frac{2\pi}{N}(0-0\cdot f_0)n} & e^{j\frac{2\pi}{N}(1-1\cdot f_0)n} & \ldots & e^{j\frac{2\pi}{N}\left(k-\lfloor\frac{k+1}{2}\rfloor f_0\right)n} & \ldots & e^{j\frac{2\pi}{N}\left(N-1-\frac{N}{2}f_0\right)n} \\ \vdots & \vdots & & \vdots & & \vdots \\ e^{j\frac{2\pi}{N}(0-0\cdot f_0)(N-1)} & e^{j\frac{2\pi}{N}(1-1\cdot f_0)(N-1)} & \ldots & e^{j\frac{2\pi}{N}\left(k-\lfloor\frac{k+1}{2}\rfloor f_0\right)(N-1)} & \ldots & e^{j\frac{2\pi}{N}\left(N-1-\frac{N}{2}f_0\right)(N-1)} \end{bmatrix}, \quad (8)$$

where $F^{-1}$ means an IFFT matrix.

Then, the operating function R of the post-processor 410 is defined as follows:

$$\frac{1}{\sqrt{N}} \begin{bmatrix} e^{j\frac{2\pi}{N}(0-0\cdot f_0)\cdot 0} & e^{j\frac{2\pi}{N}(1-f_0)\cdot 0} & \ldots & e^{j\frac{2\pi}{N}\left(k-\lfloor\frac{k+1}{2}\rfloor f_0\right)\cdot 0} & \ldots & e^{j\frac{2\pi}{N}\left(N-1-\frac{N}{2}f_0\right)\cdot 0} \\ e^{j\frac{2\pi}{N}(0-0\cdot f_0)\cdot 1} & e^{j\frac{2\pi}{N}(1-f_0)\cdot 1} & \ldots & e^{j\frac{2\pi}{N}\left(k-\lfloor\frac{k+1}{2}\rfloor f_0\right)\cdot 1} & \ldots & e^{j\frac{2\pi}{N}\left(N-1-\frac{N}{2}f_0\right)\cdot 1} \\ \vdots & \vdots & \vdots & \vdots & \vdots & \vdots \\ e^{j\frac{2\pi}{N}(0-0\cdot f_0)n} & e^{j\frac{2\pi}{N}(1-f_0)n} & \ldots & e^{j\frac{2\pi}{N}\left(k-\lfloor\frac{k+1}{2}\rfloor f_0\right)n} & \ldots & e^{j\frac{2\pi}{N}\left(N-1-\frac{N}{2}f_0\right)n} \\ \vdots & \vdots & & \vdots & & \vdots \\ e^{j2\pi(0-0\cdot f_0)(N-1)} & e^{j\frac{2\pi}{N}(1-f_0)(N-1)} & \ldots & e^{j\frac{2\pi}{N}\left(k-\lfloor\frac{k+1}{2}\rfloor f_0\right)(N-1)} & \ldots & e^{j\frac{2\pi}{N}\left(N-1-\frac{N}{2}f_0\right)(N-1)} \end{bmatrix} F, \quad (9)$$

where F denotes an FFT matrix.

A signal processed by the post-processor 410 is converted into a serial signal by the P/S 412. A Cyclic Prefix (CP) adder 414 adds a CP to the serial signal. The output signal of the CP adder 414 is wirelessly received by a transmission antenna 424 via a transmission circuit 422. The transmission circuit 422 converts an input signal into an analog signal through a Digital-to-Analog Converter (DAC) 416, up-converts the analog signal by a carrier frequency fc through a frequency converter 418, and amplifies the up-converted analog signal through a Power Amplifier (PA) for transmission to the transmission antenna 424.

Figure 5:
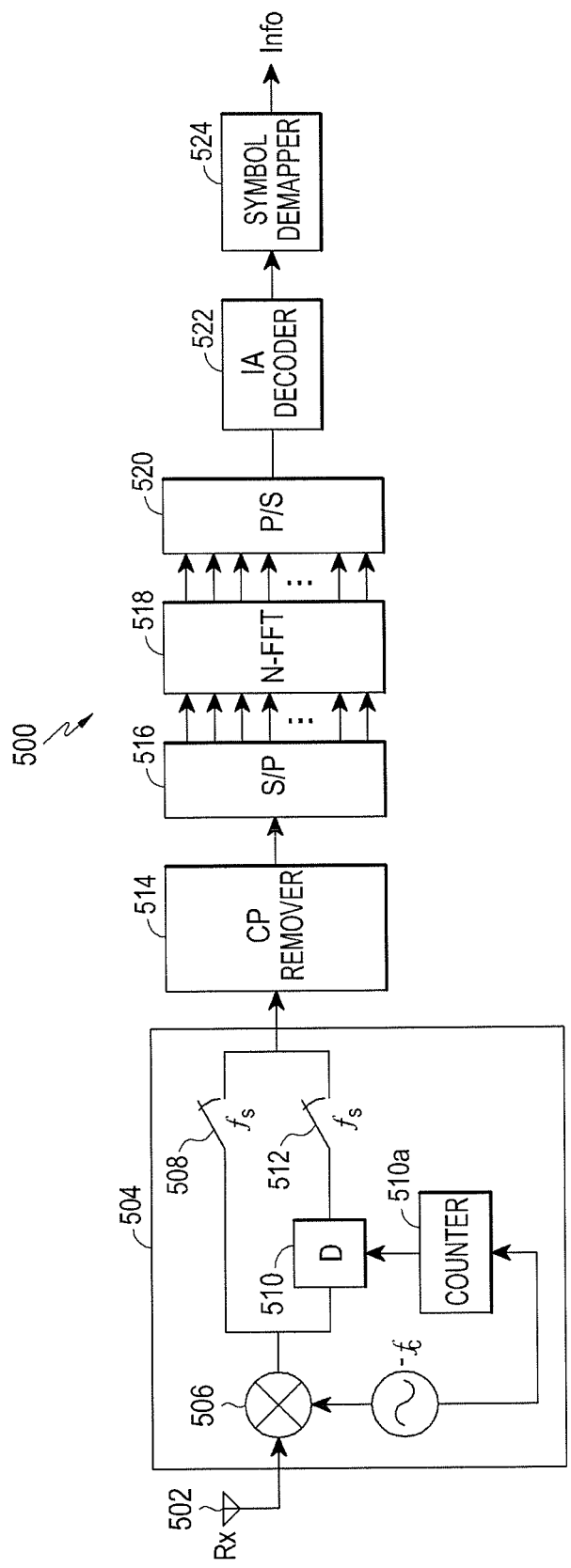
FIG. 5 illustrates a block diagram of a structure of a receiver according to embodiment of the present disclosure.

FIG. 5 illustrates a block diagram of a structure of a receiver according to embodiments of the present disclosure, in which a structure of an OFDM receiver for implementing unequal subcarrier spacings for IA application in an OFDM system is shown.

Referring to FIG. 5, a receiver 500 converts a wireless signal received through a reception antenna 502 into a digital signal through a reception circuit 504. In the reception circuit 504, the wireless signal is down-converted by a carrier frequency $-f_c$ by a frequency converter 506. The down-converted signal is parallel-input to a first sampler 508 and a second sampler 512. The second sampler 512 inputs the down-converted signal therein through a delayer 510 that is enabled by a counter 510a operating based on the carrier frequency $f_c$. More specifically, the counter 510a receives as inputs a signal of the carrier frequency $f_c$ to count pulses of the carrier frequency signal. If the number of pulses reaches a predetermined value, that is, $f_c/2f_s$, the counter 510a enables the delayer 510. The delayer 510 transfers the signal delayed by $f_c/2f_s$ to the second sampler 512, in response to the signal from the counter 510a.

The first sampler 508 takes samples from the input signal based on a sampling frequency $f_s$ (corresponding to subcarrier spacings) and transfers the samples to a CP remover 514. Likewise, the second sampler 512 takes samples from the signal input through the delayer 510 based on the sampling frequency $f_s$ and transfers the samples to the CP remover 514. In this way, the reception circuit 504 forms a received signal including the signal samples extracted from subcarriers having unequal spacings.

The CP remover 514 removes a CP from the signal samples provided from the two samplers 508 and 512 to form a signal including a total of 1024 samples. An S/P 516 converts a signal from the CP remover 514 into parallel signals and maps the parallel signals to 1024 inputs of an FFT unit 518. The FFT unit 518 performs OFDM demodulation to generate FFT outputs including 1024 signal elements. The FFT outputs are converted into a received signal vector in a serial form by a P/S 520 and then the received signal vector is transferred to an IA decoder 522.

The IA decoder 522 decodes 512 signal elements transmitted from a desired transmitter from the received signal vector, by using IA precoding vectors applied by IA precoding of transmitters and channel information measured between the transmitters and receivers. To this end, the receiver 500 receives information regarding the IA precoding vectors from the transmitters through separate signaling. A symbol demapper 524 detects desired information by performing symbol demapping on the signal elements.

A description will now be made of the IA precoding vectors for IA precoding in the transmitters.

Let elements of an IA precoding vector applied to an input symbol $p^{[i]}$ to carry the input symbol $p^{[i]}$ in two frequencies $f_1$ and $f_2$ be $v_1^{[i]}$ and $v_2^{[i]}$. A received signal vector formed in the first receiver is derived from Equation 4 as follows:

$$y_1^{[3n+1]} = (h_{f(2n+1)}^{[11]} v_1^{[3n+1]} + \varepsilon v_2^{[3n+1]}) p^{[3n+1]} + \qquad (10)$$
$$(h_{f(2n+1)}^{[21]} v_1^{[3n+2]} + \varepsilon v_2^{[3n+2]}) p^{[3n+2]} +$$
$$(h_{f(2n+1)}^{[31]} v_1^{[3n+3]} + \varepsilon v_2^{[3n+3]}) p^{[3n+3]}$$
$$y_2^{[3n+1]} = (\varepsilon v_1^{[3n+1]} + h_{f(2n+2)}^{[11]} v_2^{[3n+1]}) p^{[3n+1]} +$$
$$(\varepsilon v_1^{[3n+2]} + h_{f(2n+2)}^{[21]} v_2^{[3n+2]}) p^{[3n+2]} +$$
$$(\varepsilon v_1^{[3n+3]} + h_{f(2n+2)}^{[31]} v_2^{[3n+3]}) p^{[3n+3]},$$

where $y_1^{[3n+1]}$ and $y_2^{[3n+1]}$ denote the first signal element and the second signal element of a received signal vector corresponding to 2 subcarriers carrying an $n^{th}$ input symbol, and $h_{f(2n+1)}^{[i1]}$ and $h_{f(2n+2)}^{[i1]}$ denote channel values measured with respect to a channel from an $i^{th}$ transmitter to the first receiver for 2 subcarriers carrying the $n^{th}$ input symbol, and $\varepsilon$ denotes the above-described scaling factor.

In light of the first receiver, to remove interference symbols $p^{[3n+2]}$ and $p^{[3n+3]}$ and detect a symbol $p^{[3n+1]}$ to be received, a precoding vector is set to establish the following relationship equation. That is, elements of the precoding vector need to be set such that a rate of subcarrier coefficients of the first interference symbol is equal to a rate of subcarrier coefficients of the second interference symbol and is different from a rate of subcarrier coefficients of a symbol to be received. See Equation 11:

$$\frac{h_{f(2n+1)}^{[21]} v_1^{[3n+2]} + \varepsilon v_2^{[3n+2]}}{\varepsilon v_1^{[3n+2]} + h_{f(2n+2)}^{[21]} v_2^{[3n+2]}} = \frac{h_{f(2n+1)}^{[31]} v_1^{[3n+3]} + \varepsilon v_2^{[3n+3]}}{\varepsilon v_1^{[3n+3]} + h_{f(2n+2)}^{[31]} v_2^{[3n+3]}} \qquad (11)$$
$$\neq \frac{h_{f(2n+1)}^{[11]} v_1^{[3n+1]} + \varepsilon v_2^{[3n+1]}}{\varepsilon v_1^{[3n+1]} + h_{f(2n+2)}^{[11]} v_2^{[3n+1]}}$$

Equation 12 rewrites Equation 11 in the form of a channel matrix H and a precoding vector V.

$$H_{f(2n+1)f(2n+2)}^{[31]} V^{[3n+3]} = k_1 H_{f(2n+1)f(2n+2)}^{[21]} V^{[3n+2]} \qquad (12)$$
$$\neq m_1 H_{f(2n+1)f(2n+2)}^{[11]} V^{[3n+1]}$$
$$H_{f(2n+1)f(2n+2)}^{[12]} V^{[3n+1]} = k_2 H_{f(2n+1)f(2n+2)}^{[32]} V^{[3n+3]}$$
$$\neq m_2 H_{f(2n+1)f(2n+2)}^{[22]} V^{[3n+2]}$$
$$H_{f(2n+1)f(2n+2)}^{[23]} V^{[3n+2]} = k_3 H_{f(2n+1)f(2n+2)}^{[13]} V^{[3n+1]}$$
$$\neq m_3 H_{f(2n+1)f(2n+2)}^{[33]} V^{[3n+3]},$$

where $k_1$, $k_2$, $k_3$ and $m_1$, $m_2$, $m_3$ denote arbitrarily set constant values.

A precoding vector $V^{[3n+1]}$ for use in the first transmitter is determined to be an eigenvector of a matrix A corresponding to an eigenvalue of $1/(k_1 k_2 k_3)$ obtained as a solution of Equation 13.

$$\det\left(H_{f(2n+1)f(2n+2)}^{[12]^{-1}} H_{f(2n+1)f(2n+2)}^{[32]} H_{f(2n+1)f(2n+2)}^{[31]^{-1}} \right.$$
$$\left. H_{f(2n+1)f(2n+2)}^{[21]} H_{f(2n+1)f(2n+2)}^{[23]^{-1}} H_{f(2n+1)f(2n+2)}^{[13]} - \frac{1}{k_1 k_2 k_3} I\right) = 0$$
$$\det\left(A - \frac{1}{k_1 k_2 k_3} I\right) = 0$$

Then, precoding vectors $V^{[3n+2]}$ and $V^{[3n+3]}$ for use in the second and third transmitters are given by:

$$V^{[3n+2]} = k_3 H_{f(2n+1)f(2n+2)}^{[23]^{-1}} H_{f(2n+1)f(2n+2)}^{[13]} V^{[3n+2]}$$
$$V^{[3n+3]} = k_1 k_3 H_{f(2n+1)f(2n+2)}^{[31]^{-1}} H_{f(2n+1)f(2n+2)}^{[21]}$$
$$H_{f(2n+1)f(2n+2)}^{[23]^{-1}} H_{f(2n+1)f(2n+2)}^{[13]} V^{[3n+1]} \qquad (14)$$

Referring back to FIG. 4, in each of the three transmitters, the IA precoder 404 multiplies each symbol by the precoding vector obtained as described above, and the precoded symbol is transmitted to the three receivers through the IFFT unit 408. The transmitters transmit information about precoding vectors used for their transmissions to the three receivers through a predefined signaling means.

By applying the precoding vectors, the received signal vectors received by the three receivers are expressed, respectively, as:

$$Y^{[3n+1]} = H_{f(2n+1)f(2n+2)}^{[11]} V^{[3n+1]} p^{[3n+1]} + H_{f(2n+1)f(2n+2)}^{[21]} V^{[3n+2]} p^{[3n+2]} + \qquad (15)$$
$$H_{f(2n+1)f(2n+2)}^{[31]} V^{[3n+3]} p^{[3n+3]}$$
$$= H_{f(2n+1)f(2n+2)}^{[11]} V^{[3n+1]} p^{[3n+1]} +$$
$$k_3 H_{f(2n+1)f(2n+2)}^{[21]} H_{f(2n+1)f(2n+2)}^{[23]^{-1}} H_{f(2n+1)f(2n+2)}^{[13]} V^{[3n+1]} p^{[3n+2]} +$$
$$k_1 k_3 H_{f(2n+1)f(2n+2)}^{[21]} H_{f(2n+1)f(2n+2)}^{[23]^{-1}} H_{f(2n+1)f(2n+2)}^{[13]} V^{[3n+1]} p^{[3n+3]}$$

$$Y^{[3n+2]} = H_{f(2n+1)f(2n+2)}^{[12]} V^{[3n+1]} p^{[3n+1]} + H_{f(2n+1)f(2n+2)}^{[22]} V^{[3n+2]} p^{[3n+2]} + \qquad (16)$$
$$H_{f(2n+1)f(2n+2)}^{[32]} V^{[3n+3]} p^{[3n+3]}$$
$$= H_{f(2n+1)f(2n+2)}^{[12]} V^{[3n+1]} p^{[3n+1]} +$$
$$k_3 H_{f(2n+1)f(2n+2)}^{[22]} H_{f(2n+1)f(2n+2)}^{[23]^{-1}} H_{f(2n+1)f(2n+2)}^{[13]} V^{[3n+1]} p^{[3n+2]} +$$
$$k_1 k_3 H_{f(2n+1)f(2n+2)}^{[21]} H_{f(2n+1)f(2n+2)}^{[23]^{-1}} H_{f(2n+1)f(2n+2)}^{[13]} V^{[3n+1]} p^{[3n+3]}$$

$$Y^{[3n+3]} = H_{f(2n+1)f(2n+2)}^{[13]} V^{[3n+1]} p^{[3n+1]} + H_{f(2n+1)f(2n+2)}^{[23]} V^{[3n+2]} p^{[3n+2]} + \qquad (17)$$
$$H_{f(2n+1)f(2n+2)}^{[33]} V^{[3n+3]} p^{[3n+3]}$$
$$= H_{f(2n+1)f(2n+2)}^{[13]} V^{[3n+1]} p^{[3n+1]} +$$
$$k_3 H_{f(2n+1)f(2n+2)}^{[23]} H_{f(2n+1)f(2n+2)}^{[23]^{-1}} H_{f(2n+1)f(2n+2)}^{[13]} V^{[3n+1]} p^{[3n+2]} +$$
$$k_1 k_3 H_{f(2n+1)f(2n+2)}^{[21]} H_{f(2n+1)f(2n+2)}^{[23]^{-1}} H_{f(2n+1)f(2n+2)}^{[13]} V^{[3n+1]} p^{[3n+3]}$$

Referring back to FIG. 5, in each of the three receivers, the IA decoder 522 detects a symbol transmitted from a desired transmitter from a corresponding received signal vector, by using information about the precoding vectors provided from the three transmitters and channel information measured with respect to two subcarriers between the three transmitters and the receiver. In each receiver, a desired symbol may be detected using:

$$p^{[3n+1]} = \frac{H^{[21]}_{f(2n+1)f(2n+2)}(2,:)V^{[3n+2]}y^{[3n+1]}_1 - H^{[21]}_{f(2n+1)f(2n+2)}(1,:)V^{[3n+2]}y^{[3n+1]}_2}{H^{[21]}_{f(2n+1)f(2n+2)}(2,:)V^{[3n+2]}H^{[11]}_{f(2n+1)f(2n+2)}(1,:)V^{[3n+1]} - H^{[21]}_{f(2n+1)f(2n+2)}(1,:)V^{[3n+2]}H^{[11]}_{f(2n+1)f(2n+2)}(2,:)V^{[3n+1]}} \quad (18)$$

$$p^{[3n+2]} = \frac{H^{[12]}_{f(2n+1)f(2n+2)}(2,:)V^{[3n+1]}y^{[3n+2]}_1 - H^{[12]}_{f(2n+1)f(2n+2)}(1,:)V^{[3n+1]}y^{[3n+2]}_2}{H^{[12]}_{f(2n+1)f(2n+2)}(2,:)V^{[3n+1]}H^{[22]}_{f(2n+1)f(2n+2)}(1,:)V^{[3n+2]} - H^{[12]}_{f(2n+1)f(2n+2)}(1,:)V^{[3n+1]}H^{[22]}_{f(2n+1)f(2n+2)}(2,:)V^{[3n+2]}}$$

$$p^{[3n+3]} = \frac{H^{[13]}_{f(2n+1)f(2n+2)}(2,:)V^{[3n+1]}y^{[3n+3]}_1 - H^{[13]}_{f(2n+1)f(2n+2)}(1,:)V^{[3n+1]}y^{[3n+3]}_2}{H^{[13]}_{f(2n+1)f(2n+2)}(2,:)V^{[3n+1]}H^{[33]}_{f(2n+1)f(2n+2)}(1,:)V^{[3n+3]} - H^{[13]}_{f(2n+1)f(2n+2)}(1,:)V^{[3n+1]}H^{[33]}_{f(2n+1)f(2n+2)}(2,:)V^{[3n+3]}}$$

where H(l,:) denotes a vector including all elements of an $l^{th}$ row of a channel matrix H.

In embodiments of the present disclosure, in a channel environment including three transmitters and three receivers, ICI is inserted into off-diagonal terms of a diagonal channel matrix originating from use of orthogonal frequency resources through unequal subcarrier spacings, such that a frequency-domain channel matrix is made into a 2×2 off-diagonal matrix and thus a precoding vector capable of achieving a DoF of 3/2 like 2×2 IA of a space domain is generated.

The other effects may be explicitly or implicitly disclosed in the description of embodiments of the present disclosure.

Although the present disclosure has been described with embodiments various changes and modifications may be suggested to one skilled in the art. It is intended that the present disclosure encompass such changes and modifications as fall within the scope of the appended claims.

What is claimed is:

1. An interference alignment method in a wireless communication system, the interference alignment method comprising:

generating a plurality of Interference Alignment (IA)-encoded signal vectors by multiplying a plurality of input symbols by precoding vectors for IA;

mapping the IA-encoded signal vectors to subcarriers that are un-equally spaced;

performing Inverse Fast Fourier Transform (IFFT) on the IA-encoded signal vectors for Orthogonal Frequency Division Multiplexing (OFDM) modulation to generate OFDM symbols;

up-converting the OFDM symbols into wireless signals and transmitting the wireless signals from a first transmitter of three transmitters to three receivers; and forwarding information regarding the precoding vectors used in the first, second, and the third transmitters to a first receiver of the three receivers, so that the first receiver can perform the IA decoding process of a desired signal, wherein the second and third transmitters share the same frequency resources with the first transmitter and transmit the wireless signals to the three receivers.

2. The interference alignment method of claim 1, wherein a first spacing between first and second subcarriers among the subcarriers having unequal spacings is smaller than a second spacing between second and third subcarriers among the subcarriers having unequal spacings.

3. The interference alignment method of claim 1, wherein a precoding vector applied to an $n^{th}$ symbol among the precoding vectors used in the first transmitter is determined to be a unique vector of a matrix A expressed as:

$$A = H_{f(2n+1)f(2n+2)}^{[12]^{-1}} H_{f(2n+1)f(2n+2)}^{[32]} H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]},$$

wherein f(2n+1) and f(2n+2) denote two subcarriers to which the nth symbol is mapped, and $H_{f(2n+1)f(2n+2)}^{[ij]}$ denotes a channel matrix measured for the two subcarriers between an $i^{th}$ transmitter and a $j^{th}$ receiver.

4. The interference alignment method of claim 1, wherein the precoding vectors used in the second and third transmitters are determined by:

$$V^{[3n+2]} = k_3 H_{f(2n+1)f(2n+2)}^{[23]^{-1}} H_{f(2n+1)f(2n+2)}^{[13]} V^{[3n+1]}$$

$$V^{[3n+3]} = k_1 k_3 H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]} V^{[3n+1]},$$

wherein $V^{[3n+1]}$, $V^{[3n+2]}$, and $V^{[3n+3]}$ denote precoding vectors applied to the $n^{th}$ symbol used in the first, second, and third transmitters, $k_1$, $k_2$, and $k_3$ denote predetermined constant values, f(2n+1) and f(2n+2) denote two subcarriers to which the $n^{th}$ symbol is mapped, and $H_{f(2n+1)f(2n+2)}^{[ij]}$ denotes a channel matrix measured for the two subcarriers between an $i^{th}$ transmitter and a $j^{th}$ receiver.

5. The interference alignment method of claim 1, wherein the subcarriers having unequal spacings are shifted by predetermined frequency shift values in a frequency domain and the frequency shift values are determined by:

$$f_{shift,k} = \begin{cases} k - \dfrac{k}{2} f_{offset}, & k: \text{even} \\ k - \dfrac{k+1}{2} f_{offset}, & k: \text{odd}, \end{cases}$$

wherein $f_{shift,k}$ denotes a frequency shift value for a $k^{th}$ subcarrier and $f_{offset}$ denotes a predefined frequency offset.

6. The interference alignment method of claim 1, further comprising multiplying signal elements of the IFFT-transformed signal by $e^{j2\pi f_{shift,k}n}$ before converting the IFFT-transformed signal into the wireless signal, wherein n denotes an index for identifying the signal components and $f_{shift,k}$ denotes a frequency shift value for a $k^{th}$ subcarrier.

7. The interference alignment method of claim 6, wherein the frequency shift value is determined by:

$$f_{shift,k} = \begin{cases} k - \dfrac{k}{2} f_{offset}, & k: \text{even} \\ k - \dfrac{k+1}{2} f_{offset}, & k: \text{odd}, \end{cases}$$

wherein $f_{shift,k}$ denotes a frequency shift value for a $k^{th}$ subcarrier and $f_{offset}$ denotes a predefined frequency offset.

8. The interference alignment method of claim 1, further comprising multiplying signal elements of the IFFT-transformed signal by a post-processing function matrix given below, before converting the IFFT-transformed signal into the wireless signal, $$\frac{1}{\sqrt{N}}\begin{bmatrix} e^{j\frac{2\pi}{N}(0-0\cdot f_0)\cdot 0} & e^{j\frac{2\pi}{N}(1-1f_0)\cdot 0} & \ldots & e^{j\frac{2\pi}{N}\left(k-\left\lfloor\frac{k+1}{2}\right\rfloor f_0\right)\cdot 0} & \ldots & e^{j\frac{2\pi}{N}\left(N-1-\frac{N}{2}f_0\right)\cdot 0} \\ e^{j\frac{2\pi}{N}(0-0\cdot f_0)\cdot 1} & e^{j\frac{2\pi}{N}(1-1f_0)\cdot 1} & \ldots & e^{j\frac{2\pi}{N}\left(k-\left\lfloor\frac{k+1}{2}\right\rfloor f_0\right)\cdot 1} & \ldots & e^{j\frac{2\pi}{N}\left(N-1-\frac{N}{2}f_0\right)\cdot 1} \\ \vdots & \vdots & \vdots & \vdots & \vdots & \vdots \\ e^{j\frac{2\pi}{N}(0-0\cdot f_0)n} & e^{j\frac{2\pi}{N}(1-1f_0)n} & \ldots & e^{j\frac{2\pi}{N}\left(k-\left\lfloor\frac{k+1}{2}\right\rfloor f_0\right)n} & \ldots & e^{j\frac{2\pi}{N}\left(N-1-\frac{N}{2}f_0\right)n} \\ \vdots & \vdots & \vdots & \vdots & \vdots & \vdots \\ e^{j\frac{2\pi}{N}(0-0\cdot f_0)(N-1)} & e^{j\frac{2\pi}{N}(1-1f_0)(N-1)} & \ldots & e^{j\frac{2\pi}{N}\left(k-\left\lfloor\frac{k+1}{2}\right\rfloor f_0\right)(N-1)} & \ldots & e^{j\frac{2\pi}{N}\left(N-1-\frac{N}{2}f_0\right)(N-1)} \end{bmatrix} F,$$

wherein N denotes the number of signal elements, $f_0$ denotes a predefined frequency offset, and F denotes an FFT matrix.

9. An interference alignment method in a wireless communication system, the interference alignment method comprising:
receiving wireless signals transmitted from a first through third transmitters that share the same frequency resource for Interference Alignment (IA);
down-converting the wireless signals to baseband signals;
extracting the Orthogonal Frequency Division Multiplexing (OFDM) symbols that are mapped to un-equally spaced subcarriers from the down-converted signals;
performing Fast Fourier Transform (FFT) on the OFDM symbols;
receiving, from one of the first through third transmitters, information regarding precoding vectors used for IA in the first through third transmitters; and
detecting a desired signal by decoding the FFT-performed signals using the precoding vectors.

10. The interference alignment method of claim 9, wherein a first spacing between first and second subcarriers among the subcarriers having unequal spacings is smaller than a second spacing between second and third subcarriers among the subcarriers having unequal spacings.

11. The interference alignment method of claim 9, wherein a precoding vector applied to an $n^{th}$ symbol among the precoding vectors used in the first transmitter is determined to be a unique vector of a matrix A expressed as:

$$A = H_{f(2n+1)f(2n+2)}^{[12]^{-1}} H_{f(2n+1)f(2n+2)}^{[32]} H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]},$$

and precoding vectors used in the second and third transmitters are determined by:

$$V^{[3n+2]} = k_3 H_{f(2n+1)f(2n+2)}^{[23]^{-1}} H_{f(2n+1)f(2n+2)}^{[13]} V^{[3n+1]}$$

$$V^{[3n+3]} = k_1 k_3 H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]} V^{[3n+1]},$$

wherein $f(2n+1)$ and $f(2n+2)$ denote two subcarriers to which the nth symbol is mapped, $H_{f(2n+1)f(2n+2)}^{[ij]}$ denotes a channel matrix measured for the two subcarriers between an $i^{th}$ transmitter and a $j^{th}$ receiver, $V^{[3n+1]}$, $V^{[3n+2]}$, and $V^{[3n+3]}$ denote precoding vectors applied to the $n^{th}$ symbol used in the first, second, and third transmitters, and $k_1$, $k_2$, and $k_3$ denote predetermined constant values.

12. The interference alignment method of claim 9, wherein the subcarriers having unequal spacings are shifted by predetermined frequency shift values in a frequency domain and the frequency shift values are determined by:

$$f_{shift,k} = \begin{cases} k - \dfrac{k}{2} f_{offset}, & k: \text{even} \\ k - \dfrac{k+1}{2} f_{offset}, & k: \text{odd}, \end{cases}$$

wherein $f_{shift,k}$ denotes a frequency shift value for a $k^{th}$ subcarrier and $f_{offset}$ denotes a predefined frequency offset.

13. The interference alignment method of claim 9, wherein the forming of the received signal comprising the signal samples comprises:
extracting signal samples from the down-converted signal according to a predetermined sampling frequency;
delaying the down-converted signal by a predetermined delay value;
extracting signal samples from the delayed signal according to the sampling frequency; and
forming the received signal comprising the extracted signal samples.

14. The interference alignment method of claim 9, wherein the detecting of the desired information symbols comprises detecting the information symbols using any one of:

$$p^{[3n+1]} = \frac{H_{f(2n+1)f(2n+2)}^{[21]}(2,:)V^{[3n+2]}y_1^{[3n+1]} - H_{f(2n+1)f(2n+2)}^{[21]}(1,:)V^{[3n+2]}y_2^{[3n+1]}}{H_{f(2n+1)f(2n+2)}^{[21]}(2,:)V^{[3n+2]}H_{f(2n+1)f(2n+2)}^{[11]}(1,:)V^{[3n+1]} - H_{f(2n+1)f(2n+2)}^{[21]}(1,:)V^{[3n+2]}H_{f(2n+1)f(2n+2)}^{[11]}(2,:)V^{[3n+1]}}$$

$$p^{[3n+2]} = \frac{H_{f(2n+1)f(2n+2)}^{[12]}(2,:)V^{[3n+1]}y_1^{[3n+2]} - H_{f(2n+1)f(2n+2)}^{[12]}(1,:)V^{[3n+1]}y_2^{[3n+2]}}{H_{f(2n+1)f(2n+2)}^{[12]}(2,:)V^{[3n+1]}H_{f(2n+1)f(2n+2)}^{[22]}(1,:)V^{[3n+2]} - H_{f(2n+1)f(2n+2)}^{[12]}(1,:)V^{[3n+1]}H_{f(2n+1)f(2n+2)}^{[22]}(2,:)V^{[3n+2]}}$$

$$p^{[3n+3]} = \frac{H_{f(2n+1)f(2n+2)}^{[13]}(2,:)V^{[3n+1]}y_1^{[3n+3]} - H_{f(2n+1)f(2n+2)}^{[13]}(1,:)V^{[3n+1]}y_2^{[3n+3]}}{H_{f(2n+1)f(2n+2)}^{[13]}(2,:)V^{[3n+1]}H_{f(2n+1)f(2n+2)}^{[33]}(1,:)V^{[3n+3]} - H_{f(2n+1)f(2n+2)}^{[13]}(1,:)V^{[3n+1]}H_{f(2n+1)f(2n+2)}^{[33]}(2,:)V^{[3n+3]}},$$

wherein $p^{[3n+1]}$, $p^{[3n+2]}$, and $p^{[3n+3]}$ denote $n^{th}$ symbols transmitted by the first, second, and third transmitters, f(2n+1) and f(2n+2) denote two subcarriers to which the $n^{th}$ symbol is mapped, $H_{f(2n+1)f(2n+2)}^{[ij]}$ denotes a channel matrix measured for the two subcarriers between an $i^{th}$ transmitter and a $j^{th}$ receiver, $V^{[3n+1]}$, $V^{[3n+2]}$, and $V^{[3n+3]}$ denote precoding vectors applied to the $n^{th}$ symbol used in the first, second, and third transmitters, and $y_1^{[3n+j]}$ and $y_2^{[3n+j]}$ denote signal elements received corresponding to the $n^{th}$ symbols in a $j^{th}$ receiver.

15. A transmission apparatus for supporting interference alignment in a wireless communication system, the transmission apparatus comprising;
a precoder configured to multiply a plurality of input symbols by precoding vectors for Interference Alignment (IA) to generate a plurality of IA-encoded signal vectors;
an Inverse Fast Fourier Transform (IFFT) unit configured to map the IA-encoded signal vectors to subcarriers that are un-equally spaced and to perform 1 on the IA-encoded signal vectors for Orthogonal Frequency Division Multiplexing (OFDM) modulation to generate OFDM symbols;
a transmission circuit configured to up-convert the OFDM symbols into wireless signals and to transmit the wireless signals to three receivers; and
a control information transmitter configured to forward information regarding the precoding vectors used in a first through third transmitters that share the same frequency resources to a first receiver of the three receivers, so that the first receiver can perform the IA decoding process of a desired signal.

16. The transmission apparatus of claim 15, wherein a first spacing between first and second subcarriers among the subcarriers having unequal spacings is smaller than a second spacing between second and third subcarriers among the subcarriers having unequal spacings.

17. The transmission apparatus of claim 15, wherein a precoding vector applied to an $n^{th}$ symbol among the precoding vectors used in the first transmitter is determined to be a unique vector of a matrix A expressed as:

$$A = H_{f(2n+1)f(2n+2)}^{[12]^{-1}} H_{f(2n+1)f(2n+2)}^{[32]} H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]},$$

wherein f(2n+1) and f(2n+2) denote two subcarriers to which the nth symbol is mapped, and $H_{f(2n+1)f(2n+2)}^{[ij]}$ denotes a channel matrix measured for the two subcarriers between an $i^{th}$ transmitter and a $j^{th}$ receiver.

18. The transmission apparatus of claim 15, wherein the precoding vectors used in the second and third transmitters are determined by:

$$V^{[3n+2]} = k_3 H_{f(2n+1)f(2n+2)}^{[23]^{-1}} H_{f(2n+1)f(2n+2)}^{[13]} V^{[3n+1]}$$

$$V^{[3n+3]} = k_1 k_3 H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]} V^{[3n+1]},$$

wherein $V^{[3n+1]}, V^{[3n+2]}$, and $V^{[3n+3]}]$ denote precoding vectors applied to the $n^{th}$ symbol used in the first, second, and third transmitters, $k_1$, $k_2$, and $k_3$ denote predetermined constant values, f(2n+1) and f(2n+2) denote two subcarriers to which the $n^{th}$ symbol is mapped, and $H_{f(2n+1)f(2n+2)}^{[ij]}$ denotes a channel matrix measured for the two subcarriers between an $i^{th}$ transmitter and a $j^{th}$ receiver.

19. The transmission apparatus of claim 15, wherein the subcarriers having unequal spacings are shifted by predetermined frequency shift values in a frequency domain and the frequency shift values are determined by:

$$f_{shift,k} = \begin{cases} k - \dfrac{k}{2} f_{offset}, & k: \text{ even} \\ k - \dfrac{k+1}{2} f_{offset}, & k: \text{ odd}, \end{cases}$$

wherein $f_{shift,k}$ denotes a frequency shift value for a $k^{th}$ subcarrier and $f_{offset}$ denotes a predefined frequency offset.

20. The transmission apparatus of claim 15, further comprising a post-processor configured to multiply signal elements of the IFFT-transformed signal by $e^{j2\pi f_{shift,k} n}$ after performing IFFT,
wherein n denotes an index for identifying the signal components and $f_{shift,k}$ denotes a frequency shift value for a $k^{th}$ subcarrier.

21. The transmission apparatus of claim 20, wherein the frequency shift value is determined by:

$$f_{shift,k} = \begin{cases} k - \dfrac{k}{2} f_{offset}, & k: \text{ even} \\ k - \dfrac{k+1}{2} f_{offset}, & k: \text{ odd}, \end{cases}$$

wherein $f_{shift,k}$ denotes a frequency shift value for a $k^{th}$ subcarrier and $f_{offset}$ denotes a predefined frequency offset.

22. The transmission apparatus of claim 15, further comprising a post-processor configured to multiply signal elements of the IFFT-transformed signal by a post-processing function matrix given below, after performing IFFT, $$\frac{1}{\sqrt{N}} \begin{bmatrix} e^{j\frac{2\pi}{N}(0-0 \cdot f_0) \cdot 0} & e^{j\frac{2\pi}{N}(1-1 f_0) \cdot 0} & \cdots & e^{j\frac{2\pi}{N}\left(k-\left\lfloor\frac{k+1}{2}\right\rfloor f_0\right) \cdot 0} & \cdots & e^{j\frac{2\pi}{N}\left(N-1-\frac{N}{2} f_0\right) \cdot 0} \\ e^{j\frac{2\pi}{N}(0-0 \cdot f_0) \cdot 1} & e^{j\frac{2\pi}{N}(1-1 f_0) \cdot 1} & \cdots & e^{j\frac{2\pi}{N}\left(k-\left\lfloor\frac{k+1}{2}\right\rfloor f_0\right) \cdot 1} & \cdots & e^{j\frac{2\pi}{N}\left(N-1-\frac{N}{2} f_0\right) \cdot 1} \\ \vdots & \vdots & \vdots & \vdots & \vdots & \vdots \\ e^{j\frac{2\pi}{N}(0-0 \cdot f_0) n} & e^{j\frac{2\pi}{N}(1-1 f_0) n} & \cdots & e^{j\frac{2\pi}{N}\left(k-\left\lfloor\frac{k+1}{2}\right\rfloor f_0\right) n} & \cdots & e^{j\frac{2\pi}{N}\left(N-1-\frac{N}{2} f_0\right) n} \\ \vdots & \vdots & \vdots & \vdots & \vdots & \vdots \\ e^{j\frac{2\pi}{N}(0-0 \cdot f_0)(N-1)} & e^{j\frac{2\pi}{N}(1-1 f_0)(N-1)} & \cdots & e^{j\frac{2\pi}{N}\left(k-\left\lfloor\frac{k+1}{2}\right\rfloor f_0\right)(N-1)} & \cdots & e^{j\frac{2\pi}{N}\left(N-1-\frac{N}{2} f_0\right)(N-1)} \end{bmatrix} F,$$

wherein N denotes the number of signal elements, $f_0$ denotes a predefined frequency offset, and F denotes an FFT matrix.

23. A receiver for performing interference alignment in a wireless communication system, the reception apparatus comprising:
 a frequency converter configured to receive wireless signals transmitted from a first through third transmitters that share the same frequency resource for Interference Alignment (IA) and to down-convert the wireless signals to baseband signals;
 a sampling unit configured to extract Orthogonal Frequency Division Multiplexing (OFDM) symbols that are mapped to un-equally spaced subcarriers from the down-converted signals;
 a Fast Fourier Transform (FFT) unit configured to perform Fast Fourier Transform (FFT) on the OFDM symbols;
 a feedback receiver configured to receive, from one of the first through third transmitters, information regarding precoding vectors used for IA in the first through third transmitters; and
 a decoder configured to detect a desired signal by decoding the FFT-performed signals using the precoding vectors.

24. The receiver of claim 23, wherein a first spacing between first and second subcarriers among the subcarriers having unequal spacings is less than a second spacing between second and third subcarriers among the subcarriers having unequal spacings.

25. The receiver of claim 23, wherein a precoding vector applied to an $n^{th}$ symbol among the precoding vectors used in the first transmitter is determined to be a unique vector of a matrix A expressed as:

$$A = H_{f(2n+1)f(2n+2)}^{[12]^{-1}} H_{f(2n+1)f(2n+2)}^{[32]} H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]},$$

and precoding vectors used in the second and third transmitters are determined by:

$$V^{[3n+2]} = k_3 H_{f(2n+1)f(2n+2)}^{[23]^{-1}} H_{f(2n+1)f(2n+2)}^{[13]} V^{[3n+1]}$$

$$V^{[3n+3]} = k_1 k_3 H_{f(2n+1)f(2n+2)}^{[31]^{-1}} H_{f(2n+1)f(2n+2)}^{[21]} H_{f(2n+1)f(2n+2)}^{[23]^{-1}} H_{f(2n+1)f(2n+2)}^{[13]} V^{[3n+1]},$$

wherein $f(2n+1)$ and $f(2n+2)$ denote two subcarriers to which the nth symbol is mapped, $H_{f(2n+1)f(2n+2)}^{[ij]}$ denotes a channel matrix measured for the two subcarriers between an $i^{th}$ transmitter and a $j^{th}$ receiver, $V^{[3n+1]}$, $V^{[3n+2]}$, and $V^{[3n+3]}$ denote precoding vectors applied to the $n^{th}$ symbol used in the first, second, and third transmitters, and $k_1$, $k_2$, and $k_3$ denote predetermined constant values.

26. The receiver of claim 23, wherein the subcarriers having unequal spacings are shifted by predetermined frequency shift values in a frequency domain and the frequency shift values are determined by:

$$f_{shift,k} = \begin{cases} k - \dfrac{k}{2} f_{offset}, & k: \text{even} \\ k - \dfrac{k+1}{2} f_{offset}, & k: \text{odd}, \end{cases}$$

wherein $f_{shift,k}$ denotes a frequency shift value for a $k^{th}$ subcarrier and $f_{offset}$ denotes a predefined frequency offset.

27. The receiver of claim 23, wherein the sampling unit comprises:
 a first sampler configured to extract signal samples from the down-converted signal according to a predetermined sampling frequency;
 a delayer configured to delay the down-converted signal by a predetermined delay value; and
 a second sampler configured to extract signal samples from the delayed signal according to the sampling frequency.

28. The receiver of claim 23, wherein the detector detects the information symbols using any one of:

$$p^{[3n+1]} = \frac{H_{f(2n+1)f(2n+2)}^{[21]}(2,:)V^{[3n+2]}y_1^{[3n+1]} - H_{f(2n+1)f(2n+2)}^{[21]}(1,:)V^{[3n+2]}y_2^{[3n+1]}}{H_{f(2n+1)f(2n+2)}^{[21]}(2,:)V^{[3n+2]} H_{f(2n+1)f(2n+2)}^{[11]}(1,:)V^{[3n+1]} - H_{f(2n+1)f(2n+2)}^{[21]}(1,:)V^{[3n+2]} H_{f(2n+1)f(2n+2)}^{[11]}(2,:)V^{[3n+1]}}$$

$$p^{[3n+2]} = \frac{H_{f(2n+1)f(2n+2)}^{[12]}(2,:)V^{[3n+1]}y_1^{[3n+2]} - H_{f(2n+1)f(2n+2)}^{[12]}(1,:)V^{[3n+1]}y_2^{[3n+2]}}{H_{f(2n+1)f(2n+2)}^{[12]}(2,:)V^{[3n+1]} H_{f(2n+1)f(2n+2)}^{[22]}(1,:)V^{[3n+2]} - H_{f(2n+1)f(2n+2)}^{[12]}(1,:)V^{[3n+1]} H_{f(2n+1)f(2n+2)}^{[22]}(2,:)V^{[3n+2]}}$$

$$p^{[3n+3]} = \frac{H_{f(2n+1)f(2n+2)}^{[13]}(2,:)V^{[3n+1]}y_1^{[3n+3]} - H_{f(2n+1)f(2n+2)}^{[13]}(1,:)V^{[3n+1]}y_2^{[3n+3]}}{H_{f(2n+1)f(2n+2)}^{[13]}(2,:)V^{[3n+1]} H_{f(2n+1)f(2n+2)}^{[33]}(1,:)V^{[3n+3]} - H_{f(2n+1)f(2n+2)}^{[13]}(1,:)V^{[3n+1]} H_{f(2n+1)f(2n+2)}^{[33]}(2,:)V^{[3n+3]}},$$

wherein $p^{[3n+1]}$, $p^{[3n+2]}$, and $p^{[3n+3]}$ denote $n^{th}$ symbols transmitted by the first, second, and third transmitters, $f(2n+1)$ and $f(2n+2)$ denote two subcarriers to which the $n^{th}$ symbol is mapped, $H_{f(2n+1)f(2n+2)}^{[ij]}$ denotes a channel matrix measured for the two subcarriers between an $i^{th}$ transmitter and a $j^{th}$ receiver, $V^{[3n+1]}$, $V^{[3n+2]}$, and $V^{[3n+3]}$ denote precoding vectors applied to the $n^{th}$ symbol used in the first, second, and third transmitters, and $y_1^{[3n+j]}$ and $y_2^{[3n+j]}$ denote signal elements received corresponding to the $n^{th}$ symbols in a $j^{th}$ receiver.

* * * * *